Figure 1:
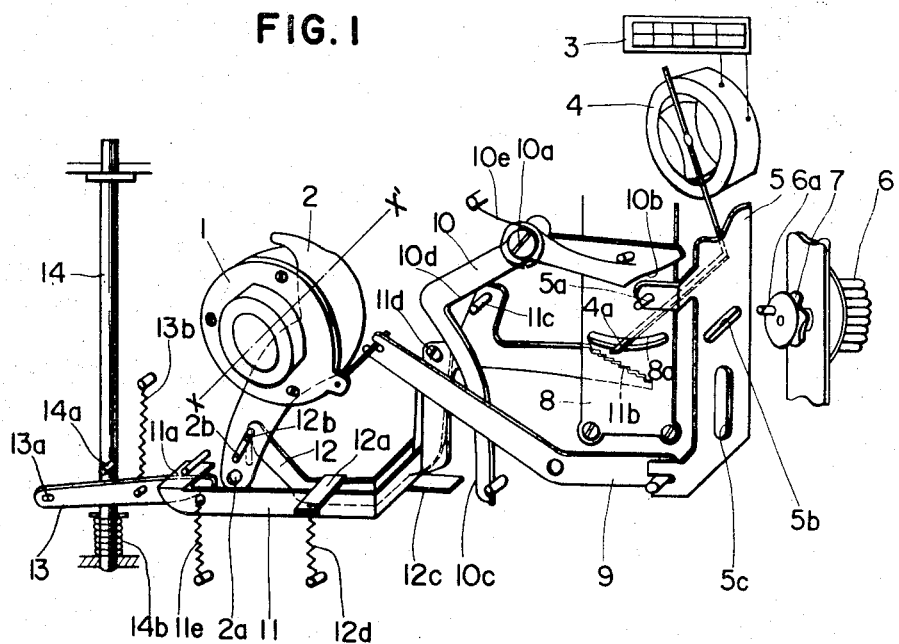

United States Patent

[11] 3,529,524

| [72] | Inventor | Hiroshi Ueda<br>Nara, Japan |
|---|---|---|
| [21] | Appl. No. | 713,393 |
| [22] | Filed | March 15, 1968 |
| [45] | Patented | Sept. 22, 1970 |
| [73] | Assignee | Minolta Camera Kabushiki Kaisha<br>Osaka, Japan<br>a corporation of Japan |
| [32] | Priority | March 17, 1967 |
| [33] | | Japan |
| [31] | | No. 42/16,771 |

[54] CAMERA CAPABLE OF AUTOMATIC SWITCHING BETWEEN BUILT-IN EXPOSURE CONTROLS FOR DAYLIGHT AND FLASH PHOTOGRAPHING
4 Claims, 2 Drawing Figs.

[52] U.S. Cl............................................. 95/10, 95/64
[51] Int. Cl........................................... G03b 7/12
[50] Field of Search........................................ 95/10C, 64A, 64

[56] References Cited
UNITED STATES PATENTS

| 3,106,882 | 10/1963 | Maitani | 95/10(C)UX |
| 3,125,939 | 3/1964 | Bundschuh et al. | 95/10(C)UX |
| 3,127,824 | 4/1964 | Williams | 95/10(C)UX |
| 3,250,193 | 5/1966 | Horton | 95/10(C)UX |
| 3,374,718 | 3/1968 | Hochreiter | 95/10(C)UX |
| 3,443,496 | 5/1969 | Sauer et al. | 95/64X |

*Primary Examiner*—John M. Horan
*Assistant Examiner*—Joseph F. Peters, Jr.
*Attorney*—Prangley, Clayton, Mullin, Dithmar and Vogel ABSTRACT: A camera capable of automatic selection between built-in exposure controls for daylight and flash photographing, depending on the brightness of the photographic object, by using a scanning member of the pointer of a built-in exposure meter. The scanning member is connected to a lens aperture control means at one end thereof. The opposite end of the scanning member selectively engages with said exposure meter pointer or a distance detecting means depending on the brightness of the photographic object.

Patented Sept. 22, 1970

3,529,524

INVENTOR
HIROSHI UEDA
BY
Mullin & Siegel
ATT'YS.

CAMERA CAPABLE OF AUTOMATIC SWITCHING BETWEEN BUILT-IN EXPOSURE CONTROLS FOR DAYLIGHT AND FLASH PHOTOGRAPHING

This invention relates to a camera capable of automatic switching between automatic exposure controls for daylight and flash photographing, depending on the brightness of a photographic object; and more particularly to the camera which automatically adjusts the exposure (shutter speed or lens aperture) so far as the photographic object is brighter than a certain brightness level, while automatically switching itself to flash photographing with automatic aperture control as soon as the photographic object becomes darker than the aforesaid brightness level.

In known cameras for carrying out both automatic exposure control for daylight and flash photographing, a clamping member to clamp an exposure meter pointer has been used in addition to a pointer scanning member. Such clamping member has two operative steps; namely a step for high brightness range (to be referred to as the "first range" hereinafter) of the photographic object wherein automatic exposure control for daylight is possible, and another step for low brightness range (to be referred to as the "second range" hereinafter) of the photographic object wherein only flash photographing is possible. For instance, there is a known electric camera having a clamping member of an exposure meter pointer, which clamps the pointer at a proper position for a bright object so as to actuate an automatic exposure control means for daylight, while moving further without clamping said pointer so as to actuate a separate automatic flash photographing means.

The use of such clamping member causes a complication in the structure of the camera, and increases the cost of the camera.

Therefore, an object of the present invention is to obviate such difficulty of known cameras by providing an automatic camera having no such clamping means, yet capable of carrying out automatic selection between the automatic exposure control for daylight and flash photographing. In an automatic camera according to the present invention, a scanning member is provided so as to cooperate with a built-in exposure meter, so that the continuous movement of the scanning member actuates not only the automatic exposure control responsive to the operative position of the exposure meter pointer, but also the selection between the automatic exposure control and the automatic flash photographing. More particularly, when the exposure meter pointer is in the first range, the scanning member senses the position of the pointer so as to effect the automatic exposure control proportionate to the brightness of each photographic object, while, as soon as the pointer comes into the second range, the scanning member actuates an automatic flash photographing means so as to set a proper lens aperture proportionate to the distance of the object from the camera for flash photographing.

In other words, known cameras use both a pointer scanning member and a clamping member in order to select the automatic exposure control or flash photographing, while, with the electric camera according to the present invention, the same selection can be carried out by using only a pointer scanning member. Thus, the structure of the camera becomes simpler, and its adjustment can be made easier.

According to a feature of the present invention, the lens aperture is regulated continuously responsive to the movement of the exposure meter pointer for automatic exposure control, while, upon actuation of a flash photographing means, the lens aperture is once fully opened and then reduced to a certain level suitable for each particular flash photographing.

It is possible to use the camera in conjunction with a known electric circuit to energize a flash bulb means only when the exposure meter pointer is in the second range. With such electric circuit, a flash bulb can be always mounted on the electric camera, so that dark objects can be photographed automatically and quickly with proper exposure without operating any outside means of the camera.

Figure 2:
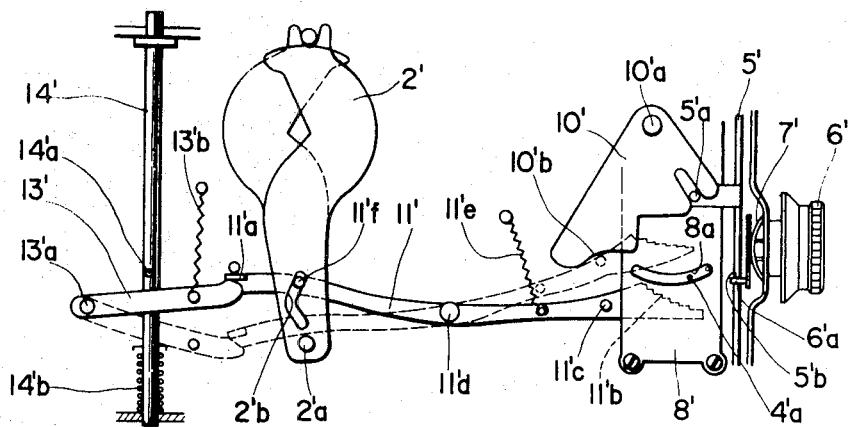

Other objects and a fuller understanding of the present invention may be had by referring to the following description and claims, taken in conjunction with the accompanying drawings, in which:

FIG. 1 is a schematic perspective view of an automatic switchable camera according to the present invention; and FIG. 2 is a modification of the camera of FIG. 1.

Like parts are designated by like numerals and symbols with addition of a prime throughout the drawings.

FIG. 1 shows an automatic camera, according to the present invention, in a nonactuated state. A lens holder 1 is disposed adjacent a lens aperture device 2, such as a Vario type two blade aperture device. A photocell 3 is mounted on the camera body so as to actuate an exposure meter 4, so that a pointer 4a of the exposure meter makes an angular displacement in proportion to the brightness of a photographic object to be shot.

The operation of the camera will now be described for the brightness in the aforesaid first range. When a shutter release shaft 14 is depressed against a spring 14b, a pin 14a secured to the release shaft 14 comes into engagement with a lever 13, so as to turn the lever 13 clockwise around a pin shaft 13a against the bias force of another spring 13b. Accordingly, the bent end portion 11a of a pointer scanning member 11, which is kept in contact with lever 13, moves downwards due to the elastic force of a spring 11e, so that the scanning member 11 rotates itself around a shaft 11d in a counter-clockwise direction. Then, a cam portion 11b, formed integrally with the scanning member 11 at the extreme right end thereof, urges the pointer 4a against the upper edge of a slit 8a bored on a base plate 8 of the exposure meter. Thus, the angular displacement of the pointer is detected, and hence, the extent of the counter-clockwise rotation of the scanning member 11 is controlled.

A lens aperture lever 12 is pivotally secured to the camera body by the shaft 11d and has a pin 12b integrally secured to one end thereof. The pin 12b operatively fits in a lens aperture actuating slot 2b of the Vario type two blade lens aperture device 2. A bias spring 12d is provided to bias the lens aperture lever 12 in a counter-clockwise direction, and a lug 12a is integrally formed on the lever 12 in a manner engageable with the scanning member 11. Thus, the lens aperture lever 12 follows the rotation of the pointer scanning member 11, and the former lever 12 stops as soon as the latter member 11 stops, provided that the pointer 4a is in the first range. Accordingly, the degree of lens aperture is determined by the position where the lens aperture lever 12 stops, which position represents the brightness of an object to be photographed.

Now, the operation of the camera for an object having a brightness in the second range will be described. Upon depression of the shutter release shaft 14, both the pointer scanning member 11 and the lens aperture lever 12 start rotating in a counter-clockwise direction, as described above. Since the pointer 4a is now positioned in the second range, the cam portion 11b of the scanning member does not come into contact with the pointer 4a, and the scanning member 11 rotates counter-clockwise beyond the slit 8a. When the lens aperture lever 12 fully opens the lens aperture device 2, a rear lug 12c of the lever 12 engages with a distance interconnecting lever 10 at the lower end portion 10c thereof, as will be described hereinafter. Thus, the counter-clockwise rotation of the lens aperture lever 12 ends, and on the contrary, the lever 12 starts rotating clockwise as the distance interconnecting lever 10 rotates clockwise.

The pointer scanning member 11 has a pin 11c integrally mounted thereto between the shaft 11d and the cam portion 11b. The position of the pin 11c is such that when the cam portion 11b of the scanning member 11 passes the slip 8a, the pin 11c comes into contact with the lower edge 10d of the distance interconnecting lever 10 in an operative manner. Accordingly, as the scanning member further rotates counter-clockwise, the distance interconnecting lever 10 is driven clockwise against the elastic force of a bias spring 10e. Thereby, the lower end 10c of the lever 10 depresses the rear lug 12c of the lens aperture lever 12 further downwards to rotate the latter clockwise so as to reduce the degree of lens aperture. The distance interconnecting lever 10 has a cam portion 10b engageable with a distance slider 5 at a pin 5a integrally secured thereto. As soon as the cam portion 10b of the lever 10 touches the pin 5c, the clockwise rotation of the distance interconnecting lever 10 stops, and hence, the similar rotation of the lens aperture lever 12 stops simultaneously, so as to set a proper lens aperture in proportion to the distance of the photographic object from the camera.

At this time, a movable switch contact (not shown) fixed to the scanning member 11, which switch contact is arranged in a known circuit for flash light photographing as disclosed in U.S. Pat. No. 3,250,193, engages a fixed switch contact (not shown) mounted on the camera body and arranged in said circuit, so that the circuit is completed for flash light photographing. Simultaneously with the opening of the shutter, a known shutter synchronizing switch (not shown) in the circuit is closed and the flash bulb is then ignited.

In this particular embodiment, as depicted in FIG. 1, the distance slider 5 is vertically reciprocative under the guidance of a pin (not shown) mounted on the camera body (not shown) so as to fit in a vertical slot 5c of the slider 5. The vertical reciprocation of the slider 5 is actuated by a distance adjusting knob 6 by means of the engagement of a pin 6a secured to the knob and a horizontal slot 5b of the distance slider 5. The vertical movement of the distance slider 5 is transmitted to the lens holder 1 through an interconnecting lever 9, so as to rotate the lens holder 1 around the optical axis X—X' thereof to achieve proper focusing effect. The locus of the movement of the pin 5a of the distance slider 5 should be so designed that the stopping position of the cam portion 10b of the distance interconnecting lever 10 is not unduly interfered with by such locus. Moreover, in order to prevent the distance slider 5 from being moved by the clockwise rotation of the cam portion 10b of the distance interconnecting lever 10, a friction member 7, or an indexing member, can be mounted on the distance adjusting knob 6.

FIG. 2 shows another embodiment of the camera according to the present invention, in which a lens aperture device 2 has a <-shaped slot 2b' so that as a pin 11f' secured to a pointer scanning member 11' moves from the top to the bottom of the slot 2b', the lens aperture varies from the minimum degree to the maximum degree and then back to the minimum degree again. With such so-called double aperture means, the lens aperture device can be directly controlled by the pointer scanning 11', without using an aperture control lever. When the pointer is in the aforesaid second range, the lens aperture is once fully opened and then controlled to a proper degree of opening suitable for flash photographing in an automatic manner.

The operation of the embodiment of FIG. 2 will now be described. When the pointer 4a' is in the aforesaid first range, upon depression of a shutter release shaft 14' against a bias spring 14b', a pin 14a' secured to the shaft 14' causes clockwise rotation of a lever 13' around a shaft 13a' against another bias spring 13b'. Thus, a pointer scanning member 11', which has an end portion 11a' engageable with the lever 13', rotates counter-clockwise around a shaft 11d' due to the bias force of a spring 11e', until a cam portion 11b' integrally formed at the extreme right end of the scanning member 11' comes into contact with a pointer 4a'. Then, the pointer 4a' is urged against the upper edge of a slit 8a' of a base plate 8' of the exposure meter, so as to determine the indication of the exposure meter. At the same time, the proper aperture corresponding to the brightness thus determined is set on the lens aperture device 2'.

Then, if the pointer 4a' is in the aforesaid second range, the pointer scanning member 11' passes the slot 8a' of the base plate 8' and continues its counter-clockwise rotation until the cam portion 10b' of a distance interconnecting lever 10' receives a pin 11c' of the scanning member 11', as shown by dotted lines in FIG. 2. As the pointer scanner 11' makes such extended rotation around the axis 11d', the lens aperture device 2' is once fully opened and then reduced to a proper degree of opening corresponding to the distance of a photographic object from the camera, by means of the engagement of the aforesaid <-shaped slot 2b' and the pin 11f' of the scanning member 11. The distance interconnecting lever 10' is reciprocatively rotated around a shaft 10a' by the pin 5a' of a distance slider 5', which slider is in turn vertically reciprocated by a distance adjusting knob 6' having a pin 6a' engageable with a slit 5b' of the slider 5'. The angular displacement of the slider 5' is determined in proportion to the distance of the photographic object from the camera. Accordingly, the angular displacement of the pointer scanning member 11' is also proportionate to the aforesaid distance between the object and the camera. An indexing means 7' can be associated with the distance adjusting knob 6', as in the case of the preceding embodiment.

In the preceding two examples, it has been assumed that the guide number of a flash bulb is constant, and that the shutter speed can be automatically selected for both the daylight photographing and for the flash photographing by a suitable means. Since means for adjustment to meet different guide numbers of flash bulbs and to provide automatic selection of different shutter speeds for daylight and flash photographing are known to those skilled in the art, no detailed description will be made here.

Although, the present invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim:

1. A camera capable of automatically switching between built-in exposure controls for daylight and flash photographing, comprising a built-in exposure meter having a pointer, a distance slider movable in proportion to the distance of a photographic object from the camera, a distance interconnecting lever actuated by said distance slider, a lens aperture device, and a rotatable scanner of said pointer of the exposure meter having one end engaged with said lens aperture device so as to set the degree of lens aperture in response to the degree of rotation of said scanner, the scanner having a cam portion integrally formed at the opposite end thereof which selectively engages with said exposure meter pointer and said distance interconnecting lever, depending on the position of the exposure meter pointer in a range suitable for daylight photographing and in another range for flash photographing.

2. A camera according to claim 1 and further comprising a lens holder and an interconnecting lever adapted to transmit the displacement of said distance slider to the lens holder, so as to rotate the lens in proportion to the displacement.

3. A camera according to claim 1 and further comprising a lens aperture lever adapted to engage with said distance interconnecting lever only when said exposure meter pointer comes into a range allowing only flash photographing, so as to actuate said lens aperture device with said lens aperture lever.

4. A camera according to claim 1 and further comprising a flash bulb actuating circuit to be energized by said scanner when said exposure meter pointer moves into the range for flash photographing.